United States Patent Office 2,815,314
Patented Dec. 3, 1957

2,815,314

THERAPEUTIC COMPOSITIONS

William J. Hale, Midland, Mich., assignor to Verdurin Company, Detroit, Mich., a corporation of Michigan No Drawing. Application March 9, 1951,
Serial No. 214,848

8 Claims. (Cl. 167—65)

This invention relates to improved therapeutic and deodorizing compositions.

As described in such earlier application, improved oral deodorants may be produced by incorporating balanced amounts of chlorophyll, preferably in water soluble form, and carotenoids in a suitable base such as a confection or mouth wash and associating with such chlorophyll-carotenoid complex a quantity of inositol which markedly enhances the deodorizing action of the composition.

The present improvement stems from the concept of associating with the chlorophyll-carotenoid complex certain derivatives of inositol which are particularly effective in enhancing the deodorizing action of chlorophyll in the mouth.

The beneficial action of water soluble chlorophyll in oral sepsis has been reported by S. L. Goldberg (Am. J. Surgery, 62:117 (1943)) in which its curative action on pyorrhea, Vincents angina and gingivitis is discussed. It has also recently been established, as reported by Dr. F. H. Wescott (N. Y. State J. Medicine, 50:6 (March 15, 1950)) that ingestion of water soluble chlorophyll in amounts of the order of 100 mg. or more daily effectively neutralizes obnoxious odors in the mouth arising from foods, beverages, tobacco and metabolic changes, as well as body odors.

The present invention is concerned with enhancing the deodorizing action of water soluble chlorophyll in the oral cavity by means of certain adjuvants which may be incorporated together with the chlorophyll in a suitable vehicle whereby the combination may effectively contact oral tissues.

It is to be observed that within the scope of the present invention a water soluble chlorophyll comprehends chlorophyllins, chlorophillides and pheophorbides. Chemically such water soluble forms of chlorophyll comprehend the presence of a free carboxyl group or its alkali salt in the phorbin molecular structure. When the phytyl group of chlorophyll (at position 7, H. Fischer nomenclature) is hydrolyzed off, the resulting phorbin is known as a chlorophyllide the alkali salt of which is soluble in water. If the hydrolysis is carried further to remove the methyl group at position 10, the resulting phorbin is known as chlorophyllin, also water soluble. Again the magnesium of the chlorophyll $a$ and $b$ molecules may be removed by weak acids to yield what are known as pheophytins $a$ and $b$ respectively; these pheophytins may be hydrolyzed to remove the phytyl group to yield water soluble pheophorbides or to remove both the phytyl and methyl group to yield pheophorbins. An important precaution in all such methods of imparting aqueous solubility to chlorophyll is to maintain intact the carbocyclic ring between position 6 and the gamma methine (CH) group to thus insure highest interchange of oxygen between the two types $a$ and $b$ of the chlorophyll structure. Such carbocyclic ring type of porphyrin is known as a phorbin.

Porphyrins, in general, are beneficial in the treatment of infections but carboxylated porphyrins, i. e., phorbins, are more efficacious than their water insoluble progenitors; they are more penetrating to tissue and stimulate granulation and epithelization. As explained in the earlier application, the presence of long chain unsaturated components of lipoid solubility, such as the carotenoids which naturally accompany chlorophyll, contribute to the activity and stability of the chlorophyll as well as being involved in the continuous oxidative-reductive function of chlorophyll $a$ and $b$.

In the normal functioning of the chlorophyll-carotenoid complex there are fortunately present in nature a group of compounds known as enzymes whose function it is to keep the carotenoids at top efficiency, otherwise the phenomenal reducto-oxidative characteristics of this same chlorophyll-carotenoid complex would run down. To this end the living plant is in constant synthesis of enzymatic agents.

With common knowledge that the presence of all vitamins definitely contributes to the improved functioning of any one of these vitamins, in what is described as a synergistic effect, it becomes abundantly clear that the carotenes (pro-vitamin A) should have stabilizing and activating cohorts among the ingredients of verdure. Factually these carotenes, and the remaining members of the group known as carotenoids, do enjoy just such stabilizers in vitamin E and vitamin K as well as in other vitamins that occur in alfalfa, spinach, lettuce and the like. Outstanding here is the stabilizing effect of vitamin E on the carotenoids (Ind. Eng. Chem. 35:774 (1943).

In further experimentation with the oral deodorants described in copending application S. N. 74,250, now abandoned, it has been ascertained that much of the efficacy of inositol in enhancing the deodorizing effect of chlorophyll is due to derivatives of the latter such as tetrahydroxyquinone and rhodizonic acid which are largely formed in the stomach. It has been found that the deodorizing action of chlorophyll in the oral cavity can be considerably enhanced and synergized by directly associating therewith certain keto-like break-down products of inositol.

It has been found, that break-down products of inositol act directly and quickly in enhancing the deodorizing action of chlorophyll. These products are mainly inosose, tetrahydroxyquinone, rhodizonic acid and triquinoyl. In the presence of warm water, triquinoyl gradually breaks down into croconic acid carrying 3 keto and 2 hydroxyl groups. Because of this instability, triquinoyl is not recommended for general use in the compositions comprehended by the invention. On the other hand it has been ascertained that rhodizonic acid and croconic acid when directly associated with chlorophyll markedly enhances the deodorizing action of the latter.

Special fermentation of inositol leads to inosose, a mono keto penta hydroxy cyclo hexane. The alkaline oxidation of inositol leads to several compounds of the keto-type which have been studied in connection with chlorophyll for the purpose of enhancing the deodorizing action. Thus, as shown below, rhodizonic acid passing through an intermediate stage yields croconic acid anhydride, a compound equally as effective for an enhancing agent as rhodizonic acid itself. So also the dehydrogenation of croconic acid yields leuconic acid, a penta-keto-cyclopentane which similarly is effective for the purposes of the invention. The speed with which these keto compounds are hydrated in body fluids and directly thereafter are oxidized make them speedily effective in their synergizing action on chlorophyll, especially in destruction of malodors arising from the stomach. These keto-type compounds carrying keto-groups in adjacent positions constitute a conjugated system and are very reactive in the presence of water and enzymes, as for example, in body fluids for general action as oxidizing agents. Indeed these compounds when used above serve quite well as oral deodorants.

The relationship of these several keto-breakdown products to each other may be depicted as follows:

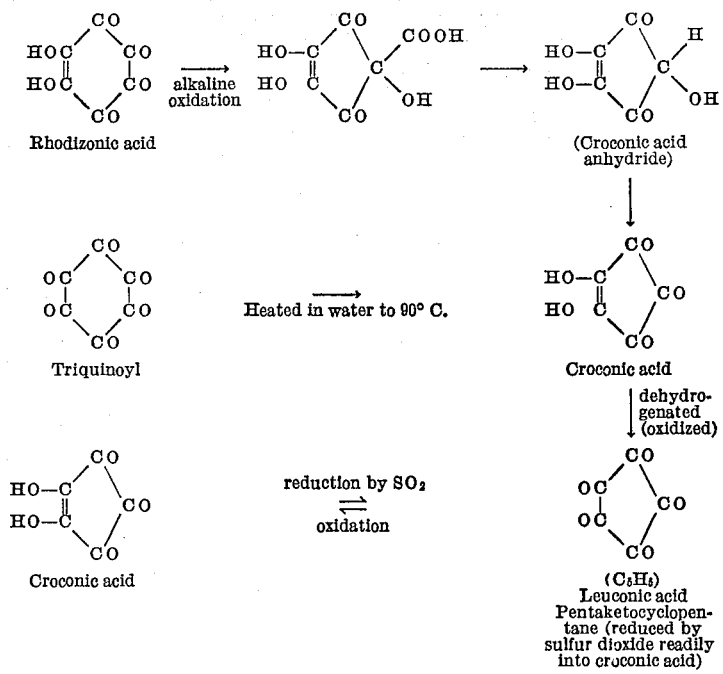

Numerous tests have established the value of these non-toxic keto-carbocyclic compound derived from inositol as effective in speeding up or enhancing the deodorizing action of chlorophyll. It is found, for example, that if one partakes of up to 4 ounces of an ordinary cocktail and then immediately takes a slowly dissolving pellet (such as a gum arabic bonded pellet) carrying 4 to 5 mg. of chlorophyllin and an equal quantity of rhodizonic acid, all traces of alcohol breath were eliminated within 30 minutes, which is a shorter deodorizing period than that secured with the same quantity of the chlorophyll alone.

The above example was repeated employing pellets carrying 4–5 mgm. of chlorophyllide and about one-half as much (2 mgm.) of rhodizonic acid. This test established that all traces of alcohol on the breath were eliminated in about 30 minutes. Repetition of this test employing 2 mgm. of tetrahydroxyquinone in combination with the chlorophyllide insured the elimination of alcoholic odors in a 30 minute period.

Numerous tests using onions and tobacco yielded like results. It is particularly to be emphasized that in such tests the alcohol breath was eliminated more quickly than when inositol was used with chlorophyll as explained in application Ser. No. 74,250, now abandoned. This is because of the fact that when these keto compounds are used in association with the chlorophyll, they can function at once as compared to inositol which requires time for its oxidation.

These keto-type compounds may be associated in any desired manner with insoluble or soluble chlorophyll to insure their enhancing action. The water soluble forms of chlorophyll are preferred because, among other things, they more effectively wet or contact the oral tissues and, as explained, such water soluble chlorophyll is associated with the naturally accompanying carotenoids and preferably also with additional stabilizing agents such as vitamins E and K. Without such stabilizing agents chlorophyll itself, especially in its water soluble form, is most rapidly degraded by the acids of the stomach.

The compounds described herein, namely the chlorophyll-carotenoid complex and the described ketocarbocyclic compounds may be incorporated in any suitable vehicle for application to oral tissues or for direct ingestion. Thus the deodorizing combination may be embodied in a confection such as hard candies, chewing gum, dry pellets bonded with any suitable water soluble binder, mouth washes, dentifrices, beverages and the like. Such compositions also may be suitably flavored.

The amount of the enhancing agent such as rhodizonic acid or croconic acid which is associated with the chlorophyll to insure effective enhancing action is not particularly critical. It has been found in practice that it is advisable to employ it in approximately equal quantities by weight as the chlorophyll-carotenoid complex or the chlorophyll alone if such is used.

The chlorophyll-carotenoid-quinoid complex which is employed may be obtained from verdure, as for example, alfalfa, spinach or the like by suitable solvent extraction with aqueous alcohol or a series of solvents such as moistened benzene, acetone and alcohol followed by suitable purification.

A convenient method of making the chlorophyll and the described enhancing adjuvants available for oral sepsis and ingestion is to incorporate them in a chewing gum base or in a sugar base pellet. Such a unit weighing about two or more grams preferably should contain about ⅙ of 1% chlorophyll or its partially or fully hydrolyzed forms, or other water soluble or partially soluble derivatives of a porphyrin; and based upon the actual weight of chlorophyll about ¹⁄₂₅ of 1% of carotenoids, approximately ¹⁄₁₀₀ of 1% thereof each of vitamins E and K and about ¹⁄₁₀ of 1% thereof or more of rhodizonic acid, or croconic acid or mixtures of these two.

While preferred illustrative embodiments of the invention have been described, it is to be understood that these are given to exemplify the underlying principles of the invention and not as limiting its useful scope to the particular preferred embodiments.

What I claim:

1. A deodorant composition comprising a suitable ingestible vehicle in which is incorporated water-soluble chlorophyll, carotenoids and an added amount of a keto-carbocyclic oxidation product of inositol of approximately equal quantities by weight of porphyrin.

2. A deodorant composition comprising a suitable ingestible vehicle in which is incorporated water-soluble chlorophyllin and an added amount of a keto-carbocyclic oxidation product of inositol of approximately equal weight as the chlorophyllin.

3. A deodorant composition comprising a suitable ingestible vehicle in which is incorporated water-soluble chlorophyll and an added amount of a keto-carbocyclic oxidation product of inositol of approximately equal weight of chlorophyll.

4. A deodorant composition comprising a comestible base in which is incorporated a water soluble form of chlorophyll and rhodizonic acid of approximately equal weight of chlorophyll.

5. A deodorant composition comprising a comestible vehicle in which is incorporated a water soluble form of chlorophyll, carotenoids and rhodizonic acid of approximately equal weight of chlorophyll.

6. A therapeutic composition comprising a comestible base in which is incorporated a water soluble form of chlorophyll, carotenoids, vitamins E and K and rhodizonic acid of approximately equal weight of chlorophyll.

7. An oral deodorant composition comprising an aqueous solution of water soluble chlorophyll and rhodizonic acid of approximately equal weight of chlorophyll.

8. An oral deodorant composition comprising a suitable vehicle in which is incorporated chlorophyll and inosose in substantially equimolecular amount of chlorophyll.

References Cited in the file of this patent

UNITED STATES PATENTS

| | | |
|---|---|---|
| 2,711,281 | Mowrey | Apr. 30, 1929 |
| 2,326,672 | Paschall | Aug. 10, 1942 |
| 2,341,986 | Hale | Feb. 15, 1944 |

OTHER REFERENCES

Drug and Cos. Ind., vol. 54, April 1944, pp. 393 and 394.

Oppenheimer: J. Mt. Sinai, May–June 1944, pp. 23–28.

Clinical Med., September 1945, pp. 307–308.

Friedman: Proceedings of the Soc. of Exp. Biol., and Med., October 1942, pp. 195–198.

Ind. and Eng. Chem., vol. 35, p. 774 (1943).

Science News Letter, July 18, 1942, p. 40.